United States Patent [19]

Itoda et al.

[11] Patent Number: 5,250,602

[45] Date of Patent: *Oct. 5, 1993

[54] POLYMER EMULSION AND METHOD FOR PREPARING THE SAME

[75] Inventors: Hiroshi Itoda, Yokohama; Naotaka Watanabe; Yoshio Hosoya, both of Tokyo, all of Japan

[73] Assignee: Mitsui-Cyanamid, Ltd., Tokyo, Japan

[ * ] Notice: The portion of the term of this patent subsequent to Dec. 3, 2008 has been disclaimed.

[21] Appl. No.: 473,155

[22] Filed: Jan. 31, 1990

[51] Int. Cl.$^5$ ............................ C08J 3/02; C08L 9/00; C08L 39/02; C08F 20/10

[52] U.S. Cl. ............................. 524/457; 524/458; 524/555; 524/815; 525/330.5; 525/902; 526/930

[58] Field of Search ............... 524/458, 815, 555, 457, 524/460; 525/902, 330.5; 526/930

[56] References Cited

U.S. PATENT DOCUMENTS

| | | | |
|---|---|---|---|
| 3,950,296 | 4/1976 | Kangas et al. | 524/555 |
| 4,379,869 | 4/1983 | Siadat et al. | 524/815 |
| 4,431,769 | 2/1984 | Yoshida et al. | 524/555 |
| 4,434,267 | 2/1984 | Maslanka et al. | 524/458 |
| 4,525,526 | 6/1985 | Wessling et al. | 524/815 |
| 4,629,757 | 12/1986 | Esser et al. | 524/457 |
| 4,728,686 | 3/1988 | Guioth et al. | 524/458 |
| 4,791,161 | 12/1988 | Leising et al. | 524/457 |
| 4,997,895 | 3/1991 | Ohmae et al. | 524/815 |
| 5,069,721 | 12/1991 | Tamura et al. | 524/425 |
| 5,069,754 | 12/1991 | Watanabe et al. | 162/169 |

FOREIGN PATENT DOCUMENTS 57-121048 7/1982 Japan .
59-142217 8/1984 Japan .
61-261302 11/1986 Japan .

*Primary Examiner*—Paul R. Michl
*Assistant Examiner*—Tae H. Yoon
*Attorney, Agent, or Firm*—Wenderoth, Lind & Ponack

[57] ABSTRACT

Disclosed are a polymer emulsion prepared by neutralizing a seed polymer with an acid or a salt or by quaternizing it with a quaternizing agent and a method of preparing the polymer emulsion. The surfaces of the emulsion grains are very densely cationated. The seed polymer is formed by polymerizing a monomer of formula (I) or a mixture of the monomer (I) and copolymerizable ethylenic unsaturated monomer(s) (II) and a seed latex of a carboxyl-modified synthetic rubber latex or synthetic resin emulsion.

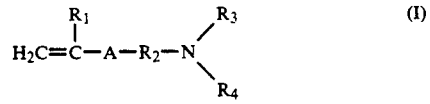

$R_1$ is H or $CH_3$; $R_2$ is a 2-5C alkylene; $R_3$ and $R_4$ each are H or a 1-5C alkyl; A is —COO— or —CONH—; and $R_1$, $R_3$ and $R_4$ are so selected that the monomer is hardly soluble or insoluble in water. As a consequence of being very densely cationated by post-modification, the cationic polymer emulsion is useful in various fields as binders, fixers or other additives.

8 Claims, No Drawings

POLYMER EMULSION AND METHOD FOR PREPARING THE SAME

FIELD OF THE INVENTION

The present invention relates to a stable polymer emulsion where cationic groups are distributed very densely at least on the surfaces of the latex grains and to a method for preparing the same. More precisely, it relates to a polymer emulsion which is suitably used, because of the cationic property thereof, as a paper strength-reinforcing binder, a fixing agent or a retention-improving agent in the beater size-processing step in preparation of pulp, synthetic fibers or inorganic fibers, or as a binder for preparation of napped fabric, non-woven fabric, carpet backing, or as a hand-improving agent, an antistatic agent or a water-proofing agent for fibers, or as a mortar additive, a cement additive, an asphalt additive, an adhesive or a coating paint material, and also relates to a method for preparing the polymer emulsion.

BACKGROUND OF THE INVENTION

Hitherto, a carboxyl-modified latex has been employed as a binder for various fibers, asphalts, mortars, concretes or ceramics, for instance.

Various cationic polymer emulsions have been proposed, most of which, however, are not sufficiently effective to the use and the object thereof. Additionally, methods of preparing such polymer emulsions require complicated steps.

For example, there is known a method of copolymerizing a cationic monomer and other monomer(s) by seed polymerization in the absence of an emulsifier or in the presence of a cationic surfactant. According to the method, a seed latex is first prepared from the total amount of the cationic monomer and a part of the other monomer(s) and subsequently the remaining monomers are added to the resulting seed latex. Therefore, it is impossible to impart a large number of cationic groups to the surfaces of the latex grains by the said method so that stable polymerization is impossible (Japanese Patent Application Laid-Open Nos. 57-121048 and 59-142217).

Another method is known, where an ethylenic unsaturated monomer containing a cationic group-imparting agent selected from secondary amines, tertiary amines and quaternary ammonium salts is copolymerized with a part of copolymerizable ethylenic unsaturated monomer(s) in the presence of a chain-transfer agent in an aqueous medium to give a seed latex and thereafter the remaining monomers are added to the resulting seed latex to continue the copolymerization (Japanese Patent Application Laid-Open No. 61-261302).

The latter method is different from the former method. Specifically, according to the latter method, a cationic group-imparting agent is previously added to the monomer to be copolymerized for forming the seed latex so that the effect of imparting the cationic groups to the surfaces of the latex grains could be expected in some degree. However, the method requires the use of a chain-transfer agent in the step of preparing the seed latex, which is troublesome.

SUMMARY OF THE INVENTION

The object of the present invention is to provide a polymer latex where the surfaces of the latex grains are highly densely cationated. Specifically, a stable seed polymer is prepared by simple and stable seed polymerization of a known carboxyl-modified latex seed with a hardly water-soluble or water-insoluble monomer almost without cationic dissociation, and the resulting seed polymer is neutralized with an acid or a salt or is quaternized with a quaternizing agent whereby the surfaces of the latex grains are very densely cationated.

The present inventors have found that a polymer latex having cationic groups as distributed highly densely on the surfaces of the polymer grains can be obtained by neutralizing a polymer, which is obtained by seed-polymerization of a seed latex of a known synthetic rubber latex or synthetic resin emulsion and particular monomer(s), with an acid or a salt or by quaternizing the seed polymer with a quaternizing agent. They have further found that the emulsion grains thus prepared are stable and the method of preparing the polymer latex is simple without requiring any complicated operation and is therefore economically advantageous. On the basis of the findings, they have hereby achieved the present invention.

Specifically, in accordance with the present invention, there is provided a seed polymer emulsion to be obtained by addition polymerization of a seed latex of a synthetic rubber latex or synthetic resin emulsion and a monomer as represented by the following general formula (I) or a mixture of the monomer and copolymerizable ethylenic unsaturated monomer(s). There is further provided a polymer emulsion to be obtained by neutralizing the seed polymer emulsion with an acid or a salt or by quaternizing it with a quaternizing agent, the surfaces of the latex grains being thereby highly densely cationated, as well as a method for preparing such polymer emulsion.

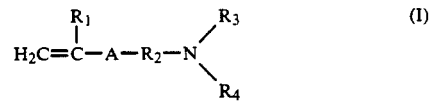

in which $R_1$ represents H or $CH_3$;

$R_2$ represents an alkylene group having from 2 to 5 carbon atoms;

$R_3$ and $R_4$ each represents H or an alkyl group having from 1 to 5 carbon atoms;

A represents

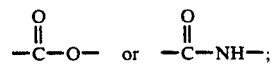

and $R_1$, $R_3$ and $R_4$ are so selected that the monomer is hardly soluble or insoluble in water.

DETAILED EXPLANATION OF THE INVENTION

The present invention will be explained in detail hereunder.

As the synthetic rubber latex or synthetic resin emulsion for use in the present invention, any one known in the technical field can be employed. However, as nonionic substances are hardly stable and cationic substances are few, anionic substances are generally preferably employed.

As examples of the synthetic rubber latex usable in the present invention, there are mentioned carboxyl-modified latexes of styrene-butadiene rubber (SBR), methyl methacrylate-butadiene rubber (MBR), acrylonitrile-butadiene rubber (NBR) or a rubber comprising the said rubber and other monomer component(s) (a), as well as chloroprene rubber (CR) or isoprene rubber (IR). As examples of the synthetic resin emulsion also usable in the present invention, there are mentioned carboxyl-modified emulsions of polymers or copolymers of acrylates, vinyl acetate, vinyl chloride or styrenes, as well as ethylene-vinyl acetate copolymers or ethylene-vinyl chloride copolymers.

The particular monomers for use in the present invention include the monomers represented by the general formula (I) and ethylenic unsaturated monomers (II) which are copolymerizable with the monomers (I).

As examples of the monomers of the formula (I), there are mentioned diethylaninoethyl acrylate, diethylaminoethyl methacrylate dipropylaminoethyl acrylate, dipropylaminoethyl methacrylate, dibutylaminoethyl methacrylate, t-butylaminoethyl (meth)acrylate, diethylaminopropyl-methacrylamide, dipropylaminopropylmethacrylamide, dipropylaminopropyl-acrylamide, dibutylaminopropyl methacrylamide and dibutylaminopropyl-acrylamide.

Other ethylenic unsaturated monomers (II) which are copolymerizable with the monomers (I) include, for example, hydrophobic monomers such as acrylates, methacrylates, acrylonitriles, styrenes or vinyl acetate, as well as crosslinking monomers such as N,N'-methylenebisacrylamide, diallyl phthalate, divinylbenzene and (poly)ethylene glycol di (meth)acrylates.

The amounts of the above-mentioned raw materials to be employed in accordance with the present invention are as mentioned below.

The proportion of the monomer of the formula (I) to the seed latex is from 5 to 50% by weight, preferably from 10 to 30% by weight.

In general, ordinary carboxyl-modified latexes have a colloid-equivalent value of from −0.2 to −0.1 meq/g. Accordingly, if the proportion of the monomer of the formula (I) to be employed in the present invention is less than 5% by weight, a stable cationic latex could not be obtained as the amount of the cationic groups is too small. On the contrary, however, if it is more than 50% by weight, the cationic groups would be economically disadvantageously excessive.

The colloid-equivalent value is obtained by the method mentioned below.

95 ml of a distilled water is put in a beaker, 5 ml of a 1000-ppm solution of a sample is added thereto, the content is adjusted to have a pH value of 4.0 with 1 %-HCl, and the whole is stirred for about one minute. Next, two or three drops of a solution of Toluidine Blue indicator are added to the resulting blend, which is then titered with N/400 PVSK. The titration speed is 2 ml/min. The time when the color of the test water changes from blue to red and the changed color is kept as it is for 10 seconds or more is the final point. The colloid-equivalent value is calculated from the following formula:

$$\text{Colloid-Equivalent Value (meq/g)} = \frac{(\text{Amount of Sample Titration} - \text{Amount of Blank Titration})}{2} \times F$$

In the formula, F indicates a factor.

The amount of the monomer (II) to be used in the invention can be determined in accordance with the glass transition point or other physical properties of the intended latex. In general, it may be from 0 to about 40% by weight to the monomer (I). The polymerization is effected by seed polymerization, where the pH value of the polymerziation system is made to be 6 or more, after the seed latex is diluted or is not diluted with water, and the above-mentioned monomers are added to the system and stirred at a temperature of 20° C. to 80° C. in the presence of a radical polymerization initiator for seed-polymerization.

If the pH value of the polymerization system is less than 6, the system would gel when the monomers are added thereto or when the monomers are polymerized and, as a result, a stable emulsion could not be obtained. Although the polymerization temperature is not specifically defined under normal pressure, it falls practically within the range of from 20 to 80° C., preferably from 30° C. to 60° C.

In the polymerization step, an additional surfactant would not be specifically necessary but may be added to the polymerization system if the content is insufficient.

The radical polymerization initiator for use in the present invention may be any one employable in conventional emulsion polymerization.

For instance, there are mentioned inorganic peroxides such as ammonium persulfate, potassium persulfate or hydrogen peroxide; aliphatic azo compounds such as azobisisobutyronitrile, 2,2'-azobis(2,4-dimethylvaleronitrile), 2,2'-azobis(2-amidinopropane)hydrochloride propane) hydrochloride or azobis(N,N'-dimethyleneisobutylamidine)-hydrochloride; benzoyl peroxide; hydroperoxides such as t-butylhydroperoxide, diisopropylbenzene-hydroperoxide or cumene-hydroperoxide; and redoxes comprising a combination of the above-mentioned peroxide and a reducing agent such as ascorbic acids, polyvalent metal salts, sodium acid sulfite or sodium formaldehyde-sulfoxylate.

The amount of the polymerization initiator to be used in the polymerization process is approximately from 1.0 to 5.0 % by weight to the monomers. The polymerization may be conducted by either a batch-wise system or a continuous system.

Next, the resulting polymer is neutralized with an acid or a salt or is quaternized with an ordinary quaternizing agent, whereby a cationic polymer emulsion where the cationic groups are distributed highly densely on the surfaces of the latex grains is obtained.

For cationation, an acid, salt or quaternizing agent is added to the seed polymer in an amount equivalent to the monomer (I), with stirring at room temperature, whereupon neutralization finishes instantly and quaternization finishes generally in approximately from 5 to 30 minutes.

The acid employable for the process includes inorganic acids such as hydrochloric acid or sulfuric acid and organic acids such as acetic acid, adipic acid, citric acid or formic acid; the salt includes acidic salts such as sodium hydrogensulfate or sodium dihydrogenphosphate; and the quarternizing agent includes alkyl halides such as methyl chloride, ethyl chloride, methyl bromide or methyl iodide and/other ordinary alkylating agents such as dimethyl sulfate or diehtyl sulfate.

In accordance with the present invention, the seed polymer obtained by the seed polymerization may be shaped, for example, into a film or the like, and then cationated by the same procedure as that mentioned above.

As a result of being cationated, the polymer emulsion of the present invention has cationic property, antistatic property, hydrophilic property and polar-affinitive property. Accordingly, it may be used in vairous fields, for example, as a coagulant; as a paper strength-reinforcing binder, a fixing agent or a retention-improving agent in papermaking process; as a binder for various fibers; as a hand -improving agent, an antistatic agent or a water-proofing agent for fibers; as an adhesive or a coating paint material; or as a concrete additive or an asphalt additive.

The following exampels are intended to illustrate the present invention in more detail but not to restrict it in any way.

EXAMPLE 1

701.3 g of a carboxyl-modified SBR latex (pH 8.3; solid content 48 %; anion colloid-equivalent value $-0.18$ meq/g), 0.4 g of N,N'-methylenebisacrylamide and 159.7 g of water were put in a flask equipped with a stirrer. With fully stirring, 37.5 g of diethylaminoethyl methacrylate (cation colloid-equivalent value of 0.51 meq/g, as quarternized dimethyl sulfate) was dropwise added thereto through a dropping funnel and thereafter the content in the flask was allowed to stand as it was for one hour with blowing $N_2$ gas thereinto. Afterwards, 80 g of 1% aqueous potassium persulfate solution was added to the reaction mixture, which was then heated up to 50° C. for polymerization. The polymerization finished in about 2 hours.

EXAMPLE 2

The same operation as in Example 1 was repeated, except that N,N'-methylenebisacrylamide was not added, and a stable polymer emulsion was obtained.

EXAMPLE 3

530 g of a carboxyl-modified MBR latex (pH 8.8; solid content 45%; anion colloid-equivalent value $-0.20$ meq/g) and 55 g of water were put in a flask equipped with a stirrer. With well stirring, 20 g of methyl methacylate and 40 g of diethylaminoethyl methacrylate were dropwise added thereto through a dropping funnel and thereafter the content was allowed to stand as it was for one hour with blowing $N_2$ gas thereinto. Afterwards, 120 g of 1% potassium persulfate was added to the reaction mixture, which was then heated up to 40° C. for polymerization. The polymerization finished in about 3 hours.

EXAMPLE 4

The same operation as in Example 3 was repeated, except that the methyl methacrylate was replaced by vinyl acetate, and a stable polymer emulsion was obtained.

EXAMPLE 5

The same operation as in Example 1 was repeated, except that the diethylaminoethyl methacrylate was replaced by t-butylaminoethyl methacrylate, and a stable polymer emulsion was obtained.

COMPARATIVE EXAMPLE 1

The same operation as in Example 1 was repeated, except that the pH value in the polymerization system was adjusted to 5.6. However, the polymerization system gelled in 30 minutes after initiation of the polymerization.

COMPARATIVE EXAMPLE 2

The same operation as in Example 1 was repeated, except that 37.5 g of the diethylaminoethyl methacrylate was replaced by 13.2 g of the same (cation colloid-equivalent value of 0.18 meq/g, as quaternized dimethyl sulfate), and a stable polymer emulsion was obtained.

COMPARATIVE EXAMPLE 3

The same operation as in Example 1 was repeated, except that the diethylaminoethyl methacrylate was repalced by dimethylaminoethyl methacrylate (water-soluble monomer). However, the polymerization system gelled immediately after initation of the polymerization.

The above-mentioned examples and comparative examples are summarized in Table 1 below.

TABLE 1

| | | Polymer Emulsions | | | | | | Polymerization Conditions | | |
|---|---|---|---|---|---|---|---|---|---|---|
| | | Polymer Composition (wt. %) | | | | | | | | |
| | | Seed Latex | | Monomer (I) | | Monomer (II) | | | Temp. | Time | Coagulates |
| | | Kind | Amount | Kind | Amount | Kind | Amount | pH | (°C.) | (hr) | (%) |
| Examples | 1 | SBR | 89.9 | DEA | 10.0 | MBA | 0.1 | 8.3 | 50 | 2 | <0.1 |
| | 2 | SBR | 90.0 | DEA | 10.0 | — | — | 8.3 | 50 | 2 | <0.1 |
| | 3 | MBR | 79.9 | DEA | 13.4 | MMA | 6.7 | 8.8 | 40 | 3 | <0.1 |
| | 4 | MBR | 79.9 | DEA | 13.4 | V.Ac | 6.7 | 8.8 | 40 | 3 | <0.1 |
| | 5 | SBR | 89.9 | t-BA | 10.0 | MBA | 0.1 | 8.3 | 50 | 2 | <0.1 |
| Comparative Examples | 1 | SBR | 89.9 | DEA | 10.0 | MBA | 0.1 | 5.6 | 50 | 0.5 | Gelled |
| | 2 | SBR | 96.1 | DEA | 3.8 | MBA | 0.1 | 8.3 | 50 | 2 | <0.1 |
| | 3 | SBR | 89.9 | DM | 10.0 | MBA | 0.1 | 8.3 | 50 | 0.1 | Gelled |

SBR: Styrene/Butadiene = 60/40 (parts)
DEA: Diethylaminoethyl Methacrylate
MMA: Methyl Methacrylate
t-BA: t-Butylaminoethyl Methacrylate
MBR: Methyl Methacrylate/Butadiene = 60/40 (parts)
MBA: N,N'-methylenebisacrylamide
V.Ac: Vinyl Acetate
DM: Dimethylaminoethyl Methacrylate
Coagulates: The polymer latex formed was filtered through a 300-mesh metal net and dried. The residue remained on the metal net was weighed and represented by the proportion to the solid content of the polymer.

Next, dimethyl sulfate was added to the polymer emulsion of Table 1 above in an amount equivalent to the monomer (I), with stirring at room temperature, and thereafter the whole was allowed to stand as it was for 30 minutes for quarternation.

The cationated degree was checked by measuring the colloid-equivalent value with n/400 P.V.S.K. at pH of 4.0, whereupon Toluidine Blue was used as the indicator. The results obtained are shown in Table 2 below.

TABLE 2

| | Cationic Polymer Emulsions | | |
| | Colloid-Equivalent Value (meq/g) | | |
| | Measured | Theoretical | Coagulates (%) |
|---|---|---|---|
| Example 1 | 0.32 | 0.33 | <0.1 |
| Example 2 | 0.32 | 0.33 | <0.1 |
| Example 3 | 0.46 | 0.46 | <0.1 |
| Example 4 | 0.45 | 0.46 | <0.1 |
| Example 5 | 0.33 | 0.33 | <0.1 |
| Comparative Example 2 | — | — | Gelled |

In accordance with the present invention, any ready-made polymer latex can be employed as the seed polymer latex and prepration of the seed polymer latex for the process of the invention may be omitted. In addition, stable seed polymerization can be conducted and the emulsion obtained has a uniform grain size and can be stored well for a long period of time with no trouble.

Moreover, cationic polymer emulsions of various properties can be obtained by the present invention, by appropriately selecting the seed latex and the monomers. Since the polymer emulsions are cationated by post-modification, the cationated density on the surfaces of the latex grains is high. Accordingly, the cationic polymer emulsions of the invention are useful in various fields as additives especially in papermaking.

What is claimed is:

1. A polymer emulsion prepared by a method which consists essentially of neutralizing a seed polymer with an acid or a salt or by quaternizing it with a quaternizing agent, the surfaces of the emulsion grains being thereby very densely cationated, where the seed polymer is formed by adding a monomer as represented by the following formula (I) or a mixture of the monomer (I) and copolymerizable ethylenic unsaturated monomer(s) (II) to a seed latex of a carboxyl-modified synthetic rubber latex or synthetic resin emulsion and polymerizing them:

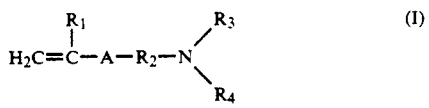

in which $R_1$ represents H or $CH_3$;

$R_2$ represents an alkylene group having from 2 to 5 carbon atoms;

$R_3$ and $R_4$ each represent H or an alkyl group having from 1 to 5 carbon atoms:

A represents

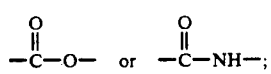

$R_1$, $R_3$ and $R_4$ are so selected that the monomer is hardly soluble or insoluble in water.

2. The polymer emulsion as claimed in claim 1, in which the amount of the monomer of the formula (I) as added corresponds to the colloid-equivalent value (absolute value) of the carboxyl-modified latex or more.

3. A method for preparing a very densely cationated polymer emulsion, wherein a seed polymer, which is obtained by polymerizing a seed latex of a carboxyl-modified synthetic rubber latex or synthetic resin emulsion as previously neutralized to a pH value of 6 or more and a monomer as represented by the following formula (I) or a mixture of the monomer (I) and copolymerizable ethylenic unsaturated monomer(s) (II) as added to the neutralized seed latex in such proportion that the amount of the monomer (I) corresponds to at least not less than the colloid-equivalent value (absolute value) of the seed latex, in the presence of a radical polymerization initiator, is neutralized with an acid or a salt or is quaternized with a quaternizing agent whereby the surfaces of the emulsion grains are very densely cationated:

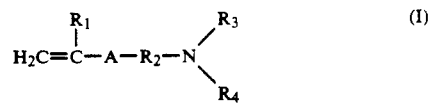

in which $R_1$ represents H or $CH_3$;

$R_2$ represents an alkylene group having from 2 to 5 carbon atoms;

$R_3$ and $R_4$ each represent H or an alkyl group having from 1 to 5 carbon atoms;

A represents

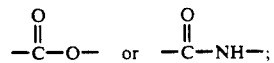

$R_1$, $R_3$ and $R_4$ are so selected that the monomer is hardly soluble or insoluble in water.

4. A seed polymer prepared by polymerization of a seed latex of a carboxyl-modified synthetic rubber latex or synthetic resin emulsion and a monomer as represented by the following formula (I) or a mixture of the monomer (I) and copolymerizable ethylenic unsaturated monomer(s) (II):

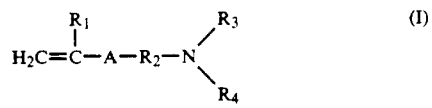

in which $R_1$ represents H or $CH_3$;

$R_2$ represents an alkylene group having from 2 to 5 carbon atoms;

$R_3$ and $R_4$ each represent H or an alkyl group having from 1 to 5 carbon atoms;

A represents

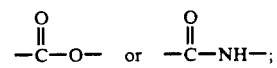

$R_1$, $R_3$ and $R_4$ are so selected that the monomer is hardly soluble or insoluble in water.

5. A method for preparing a seed polymer, wherein a seed latex of a carboxyl-modified synthetic rubber latex or synthetic resin emulsion is neutralized to a pH value of 6 or more and the thus neutralized seed latex is polymerized with a monomer as represented by the following formula (I) or a mixture of the monomer (I) and copolymerizable ethylenic unsaturated monomer(s) (II) as added to the neutralized seed latex in such proportion that the amount of the monomer (i) corresponds to at least not less than the colloid-equivalent value (absolute value) of the seed latex, in the presence of a radical polymerization initiator:

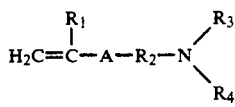

in which $R_1$ represents H or $CH_3$;

$R_2$ represents an alkylene group having from 2 to 5 carbon atoms;

$R_3$ and $R_4$ each represent H or an alkyl group having from 1 to 5 carbon atoms;

A represents

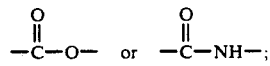

$R_1$, $R_3$ and $R_4$ are so selected that the monomer is hardly soluble or insoluble in water.

6. The polymer emulsion according to claim, 1 having a pH of 8.3–8.8.

7. The method according to claim 3, wherein the pH is 8.3–8.8.

8. The method according to claim 5, wherein the pH is 8.3–8.8.

* * * * *